US012705965B2

(12) United States Patent
Tucker

(10) Patent No.: US 12,705,965 B2
(45) Date of Patent: Aug. 11, 2026

(54) SYSTEM INCLUDING WIRELESS HANDHELD MOBILE DEVICE CONFIGURED FOR MONITORING SELECTED AREAS

(71) Applicant: T-Mobile USA, Inc., Bellevue, WA (US)

(72) Inventor: Wilfred I. Tucker, Centennial, CO (US)

(73) Assignee: T-Mobile USA, Inc., Bellevue, WA (US)

( * ) Notice: Subject to any disclaimer, the term of this patent is extended or adjusted under 35 U.S.C. 154(b) by 243 days.

(21) Appl. No.: 18/307,773

(22) Filed: Apr. 26, 2023

(65) Prior Publication Data

US 2024/0362985 A1 Oct. 31, 2024

(51) Int. Cl.

| | |
|---|---|
| ***G08B 13/196*** | (2006.01) |
| ***G06F 3/0488*** | (2022.01) |
| ***G06T 7/73*** | (2017.01) |
| ***G06T 17/00*** | (2006.01) |
| ***G06T 19/00*** | (2011.01) |
| ***G06V 10/74*** | (2022.01) |

(Continued)

(52) U.S. Cl.

CPC ..... *G08B 13/19684* (2013.01); *G06F 3/0488* (2013.01); *G06T 7/73* (2017.01); *G06T 17/00* (2013.01); *G06T 19/00* (2013.01); *G06V 10/761* (2022.01); *G06V 20/52* (2022.01); *G06V 20/653* (2022.01); *G06V 40/10* (2022.01); *G06T 2200/04* (2013.01); *G06T 2200/24* (2013.01); *G06T 2207/30196* (2013.01); *G06T 2210/56* (2013.01)

(58) Field of Classification Search

CPC ..... G06T 17/00; G06T 19/00; G06T 2200/04; G06T 2200/24; G06T 2207/30196; G06T 2210/56; G06T 7/73; G08B 13/19684; G08B 13/19686; G08B 21/22; G08B 7/06; G06V 10/235; G06V 10/761; G06V 20/52; G06V 20/653; G06V 40/10; G06F 3/0488

USPC .......................................................... 348/143

See application file for complete search history.

(56) References Cited

U.S. PATENT DOCUMENTS 8,200,186 B2 6/2012 Ashley et al.
8,285,245 B2 10/2012 Ashley et al.

(Continued)

FOREIGN PATENT DOCUMENTS

CN 113272682 A 8/2021
CN 111919250 B * 5/2024 ............ G10L 15/22

(Continued)

*Primary Examiner* — Behrooz M Senfi

(74) *Attorney, Agent, or Firm* — Ashurst Perkins Coie US LLP

(57) ABSTRACT

The document discloses technology that improves the ability of a user to detect and deter the presence of an entity (e.g., person, animal) in a selected area. The system generates a three-dimensional (3D) point map of an environment. The system can then use 3D imaging technology such as LiDAR (light detection and ranging) to generate a baseline 3D point map that includes the selected area within the environment. In operation, the system can use the 3D technology to monitor for the entity and provide alerts in real time or near real time when the entity is present in the selected area, and/or the system can perform a deterrent action that is perceivable by the entity.

20 Claims, 4 Drawing Sheets

(51) Int. Cl.

| | |
|---|---|
| ***G06V 20/52*** | (2022.01) |
| ***G06V 20/64*** | (2022.01) |
| ***G06V 40/10*** | (2022.01) |

(56) References Cited

U.S. PATENT DOCUMENTS

| | | | | |
|---|---|---|---|---|
| 8,428,867 | B2 | 4/2013 | Ashley et al. | |
| 8,483,754 | B2 | 7/2013 | Rao et al. | |
| 8,537,003 | B2 | 9/2013 | Khosravy et al. | |
| 8,818,451 | B2 | 8/2014 | Rao et al. | |
| 9,064,394 | B1 | 6/2015 | Trundle | |
| 9,392,216 | B2 | 7/2016 | Rao et al. | |
| 9,582,482 | B1 | 2/2017 | Sharifi et al. | |
| 9,606,716 | B2 | 3/2017 | Sharifi et al. | |
| 9,798,708 | B1 | 10/2017 | Sharifi et al. | |
| 9,814,993 | B2 | 11/2017 | Ponomarev et al. | |
| 9,824,079 | B1 | 11/2017 | Sharifi et al. | |
| 10,491,660 | B1 | 11/2019 | Sharifi et al. | |
| 10,535,191 | B2 | 1/2020 | Sachdeva et al. | |
| 10,584,968 | B2 | 3/2020 | Wang et al. | |
| 10,846,435 | B2 | 11/2020 | Haldenby et al. | |
| 10,866,950 | B2 | 12/2020 | Sabripour et al. | |
| 10,888,402 | B2 | 1/2021 | Kim et al. | |
| 11,157,929 | B1 | 10/2021 | Eby et al. | |
| 11,173,391 | B1 | 11/2021 | Kumar | |
| 11,195,328 | B2 | 12/2021 | Sharp | |
| 11,474,596 | B1 | 10/2022 | Aloisio et al. | |
| 11,491,395 | B1 | 11/2022 | Kumar | |
| 11,604,899 | B2 | 3/2023 | Haldenby et al. | |
| 12,063,458 | B1 * | 8/2024 | Siminoff | H04N 7/188 |
| 2013/0053701 | A1 | 2/2013 | Wiest et al. | |
| 2014/0207282 | A1 | 7/2014 | Angle et al. | |
| 2015/0019226 | A1 | 1/2015 | Gazdzinski | |
| 2015/0046820 | A1 | 2/2015 | Gazdzinski | |
| 2016/0119553 | A1 * | 4/2016 | Alm | H04N 5/272 382/103 |
| 2021/0105435 | A1 | 4/2021 | Ritchey et al. | |
| 2021/0132784 | A1 | 5/2021 | Conlon et al. | |
| 2022/0222724 | A1 | 7/2022 | Graham | |
| 2023/0351727 | A1 * | 11/2023 | Balavalikar Krishnamurthy | H04N 5/2628 |
| 2024/0096049 | A1 * | 3/2024 | Saini | H04N 23/71 |
| 2024/0296725 | A1 * | 9/2024 | Pfeiffer | G06V 20/52 |

FOREIGN PATENT DOCUMENTS

| | | | | |
|---|---|---|---|---|
| DE | 102018132764 | A1 | 6/2019 | |
| EP | 3053123 | B1 | 4/2019 | |
| EP | 2945783 | B1 | 10/2019 | |
| EP | 2572336 | B1 | 9/2021 | |
| JP | 2020124508 | A | 8/2020 | |
| JP | 7025170 | B2 | 2/2022 | |
| KR | 100819819 | B1 | 4/2008 | |
| KR | 102047432 | B1 | 11/2019 | |
| KR | 20200026798 | A | 3/2020 | |
| KR | 20200043484 | A | 4/2020 | |
| WO | 2008074478 | A2 | 6/2008 | |
| WO | 2009116663 | A1 | 9/2009 | |
| WO | 2013178869 | A1 | 12/2013 | |
| WO | 2014113806 | A1 | 7/2014 | |
| WO | 2015049420 | A1 | 4/2015 | |
| WO | 2016036282 | A1 | 3/2016 | |
| WO | 2020148658 | A2 | 7/2020 | |
| WO | 2021145938 | A2 | 7/2021 | |
| WO | WO-2023174562 | A1 * | 9/2023 | G06T 17/00 |
| WO | WO-2024068039 | A1 * | 4/2024 | G08B 13/196 |

* cited by examiner

SYSTEM INCLUDING WIRELESS HANDHELD MOBILE DEVICE CONFIGURED FOR MONITORING SELECTED AREAS

BACKGROUND

A smartphone is a portable computer device that combines mobile telephone functions and computing functions into one unit. Smartphones are distinguished from older-design feature phones because of their stronger hardware capabilities and extensive mobile operating systems, which facilitate wider software, access to the internet (including web browsing over mobile broadband), and multimedia functionality (including music, video, cameras, and gaming), alongside core phone functions such as voice calls and text messaging. Smartphones include various sensors that can be leveraged by preinstalled and third-party software (such as a magnetometer, a proximity sensor, a barometer, a gyroscope, an accelerometer, and more) and support wireless communication protocols (such as Bluetooth, Wi-Fi, or satellite navigation).

BRIEF DESCRIPTION OF THE DRAWINGS

Detailed descriptions of implementations of the present invention will be described and explained through the use of the accompanying drawings.

Figure 1:
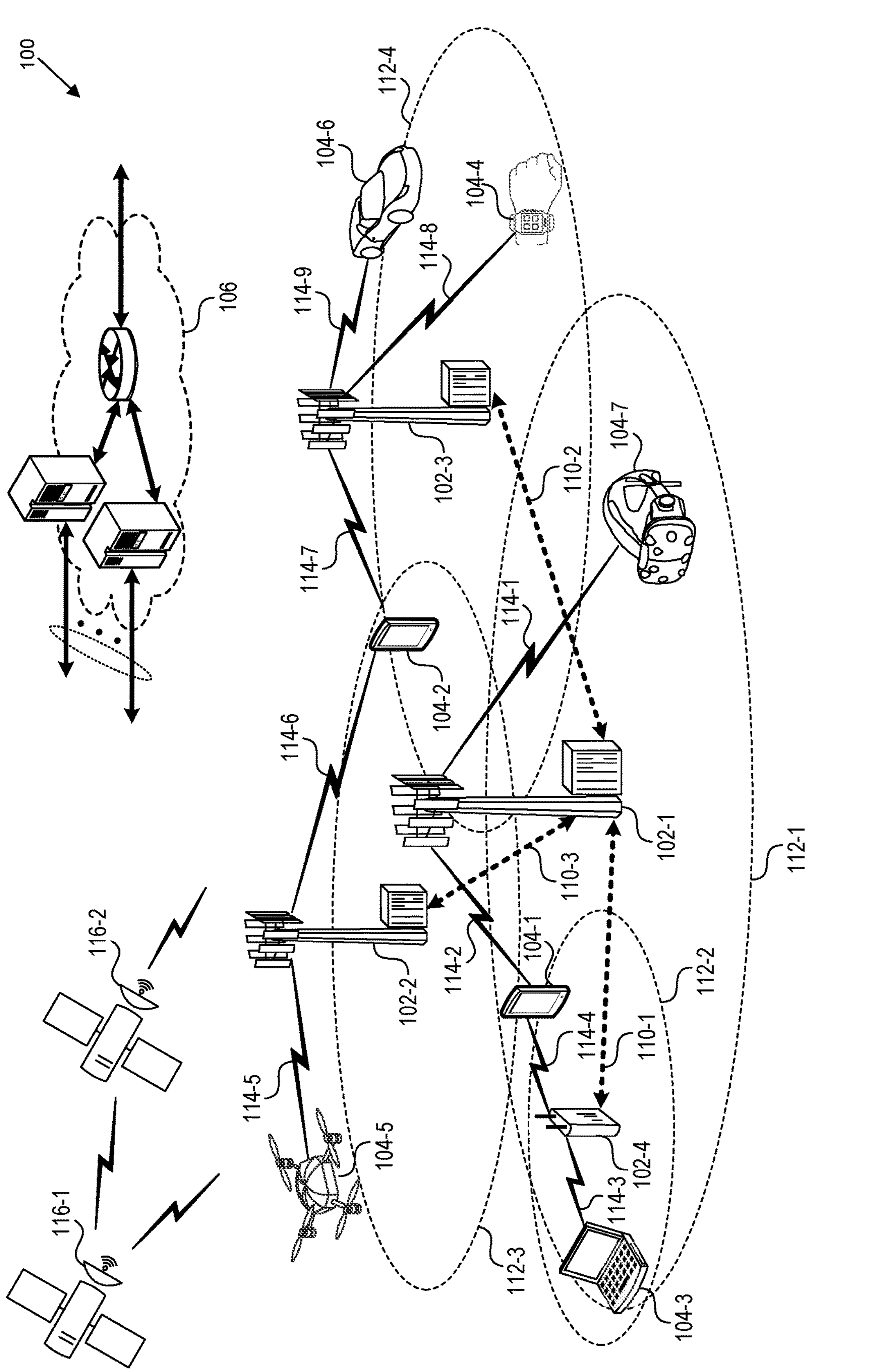
FIG. 1 is a block diagram that illustrates a wireless communications system that can implement aspects of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The disclosed technology includes a system that improves the ability of a user to detect and deter the presence of an entity (e.g., person, animal) in a selected area. The system includes a handheld mobile device (e.g., smartphone) that is configured by a user to generate a three-dimensional (3D) point map of an environment. The user can select a monitored area to shield from specified or unspecified entities. An example of an environment includes a room of a house. An example of the selected area includes a couch, and an example of the entity includes a dog. The system can use 3D imaging technology such as LiDAR (light detection and ranging) to generate a baseline 3D point map that includes the selected area within the environment. In operation, the system can use the 3D technology to monitor for the entity and provide alerts in real-time or near real-time when the entity is present in the selected area and/or the system can perform a deterrent action that is perceivable by the entity.

The 3D technology provides improved presence detection and privacy because the point map includes spatial data that lacks detailed resolution that is perceptible to a user. For example, the LiDAR point map of the room can be used to recognize the presence of a particular type of entity (e.g., person, child, animal) without allowing users to recognize features of the entity. That is, the technology can differentiate between a man, a woman, and/or a child based on shape and features but without capturing images that are perceptible by humans. In yet another example, the system implements an artificial intelligence (AI) or machine learning (ML) model to improve detection and recognition of objects and entities in an environment. For example, an AI/ML model can be trained based on data of environments, objects in the environments, and/or entities. As such, predictive technology can disambiguate between different types of entities and/or better recognize (e.g., identify) entities while obscuring a user's ability to perceive features of the entities, thereby providing privacy.

The system generates the baseline 3D representation by performing a process that involves using a smartphone to scan its one or more time-of-flight (ToF) sensors across the environment. A ToF sensor emits laser-light pulses used to measure depth information including distances to objects in the environment. In one example, LiDAR can use multiple ToF sensors to create a point map of the environment. Once the baseline point map is created, the user can define or select a boundary by using the touchscreen interface on the smartphone to manipulate a control used to designate the selected area. In operation, the system can use image recognition to detect objects and entities within the boundary of the selected area. For example, the system can detect if a dog (e.g., unwanted entity) is sitting on a couch (e.g., selected area). The system can then generate an alert that is communicated to the user's smartphone indicating the presence of the dog in the selected area and present the user a list of optional actions that can be performed to deter the dog from being in the selected area. In another example, the system automatically performs actions (e.g., without user intervention) to deter the entity based on predefined rules.

The disclosed technology solves problems associated with monitoring private areas. For example, it is difficult for users to be aware of every action their pets and kids take at home. Therefore, they cannot deter their pets or kids from going to places that are considered off-limits. This can cause many issues, such as safety concerns for small children or the destruction of property by pets. Home security systems that capture video or images of areas are not suitable for monitoring private spaces because they capture sensitive images that could be obtained by bad actors. For example, security systems are not suitable for bedrooms even though it would be useful to know if, for example, a dog or child is jumping on a bed in the bedroom.

By using the disclosed technology, parents can monitor their pets and children and deter them from entering certain areas of the house while maintaining the privacy of the space. For example, the user may not want a dog to enter the user's home office when the user is not home to watch the dog. The disclosed technology can monitor the home and specifically set a boundary for the home office, and the user can avoid any mishaps with their work computer. In this example, the user will be alerted if the system ever detects that the dog has crossed the boundary and is in the user's home office. If the user is far away at the time (e.g., the user is at work), the system can supply the user with a few options to deter or train the dog to leave the home office. For example, the system can flash a light at the dog, play a loud sound, or even allow the user to speak to the dog via a sound system connected to the smartphone over a communications network (e.g., telecommunications network).

In another implementation, the user may not want a child to open a refrigerator. The disclosed technology can set a boundary for the kitchen and specifically the area of the kitchen where the refrigerator is located, and the user can avoid any messes the child might make by removing food from the fridge. The user will receive an alert to their smartphone if the child is proximate to the refrigerator. The system can supply the user with some options of actions the system can take or perform actions in accordance with predefined rules. For example, the system can flash the kitchen lights or play audio to the child. In some implementations, the disclosed technology can be added to existing children's watches and use the location of the children's watch to map where the child is on the 3D point map.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

FIG. 1 is a block diagram that illustrates a wireless telecommunications network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104-1 through 104-7 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The coverage area 112 for a base station 102 can be divided into sectors making up only a portion of the coverage area (not shown). The network 100 can include base stations of different types (e.g., macro and/or small cell base stations). In some implementations, there can be overlapping coverage areas 112 for different service environments (e.g., Internet of Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term "eNBs" is used to describe the base stations 102, and in 5G new radio (NR) networks, the term "gNBs" is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the network 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provide data to a remote server over a network; IoT devices such as wirelessly connected smart home appliances; etc.

A wireless device (e.g., wireless devices 104-1, 104-2, 104-3, 104-4, 104-5, 104-6, and 104-7) can be referred to as a user equipment (UE), a customer premises equipment (CPE), a mobile station, a subscriber station, a mobile unit, a subscriber unit, a wireless unit, a remote unit, a handheld mobile device, a remote device, a mobile subscriber station, a terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102 and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or Time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the network 100 implements 6G technologies including increased densification or diversification of network nodes. The network 100 can enable terrestrial and non-terrestrial transmissions. In this context, a Non-Terrestrial Network (NTN) is enabled by one or more satellites, such as satellites 116-1 and 116-2, to deliver services anywhere and anytime and provide coverage in areas that are unreachable by any conventional Terrestrial Network (TN). A 6G implementation of the network 100 can support terahertz (THz) communications. This can support wireless applications that demand ultrahigh quality of service requirements and multi-terabits-per-second data transmission in the era of 6G and beyond, such as terabit-per-second backhaul systems, ultrahigh-definition content streaming among mobile devices, AR/VR, and wireless high-bandwidth secure communications. In another example of 6G, the network 100 can implement a converged Radio Access Network (RAN) and Core architecture to achieve Control and User Plane Separation (CUPS) and achieve extremely low user plane latency. In yet another example of 6G, the network 100 can implement a converged Wi-Fi and Core architecture to increase and improve indoor coverage.

System for Monitoring Selected Areas

Figure 2:
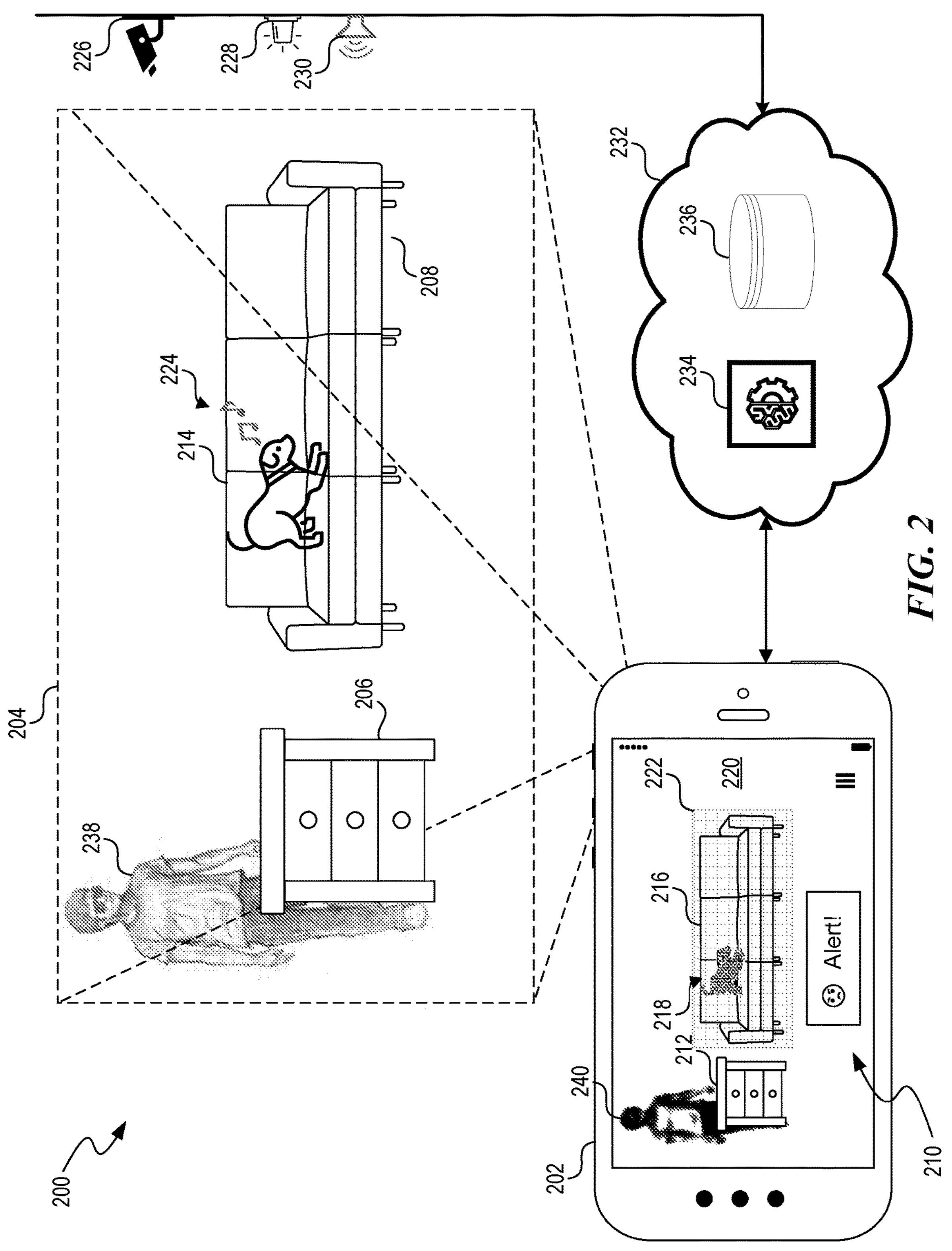
FIG. 2 illustrates a system including a wireless handheld mobile device that is configured to detect an entity in a selected area based on a visualization of a three-dimensional (3D) environment including the selected area.

FIG. 2 illustrates a system 200 including a wireless handheld mobile device that is configured to detect an entity in a selected area based on a visualization of a three-dimensional (3D) environment including the selected area. A handheld mobile device 202 is operable to generate a 3D point map as a visualization of an environment and detect the presence of an entity based on in the visualization. The handheld mobile device 202 includes one or more time-of-flight (ToF) sensors (not shown) that are capable of capturing imaging data including depth information of a scanned area 204 of a physical environment.

In the illustrated example, the scanned area 204 has physical objects including non-living objects and living entities. Examples of the non-living objects include a table 206 and a couch 208. Examples of living entities include a dog 214 and a human 238. The physical environment includes physical objects that are not in the scanned area 204. That is, there are objects in the physical environment that are outside of the scanned area 204. Examples of those objects include a monitoring device 226, a light device 228, and a sound device 230. In another example, the physical environment can include an outdoor environment such as a parking lot. The scanned area can include the user's car. The physical environment can include non-living physical objects such as other cars or other vehicles in the parking lot as well as living entities such as any humans walking around in the parking lot.

A user can position the handheld mobile device 202 so that the ToF sensor(s) of the handheld mobile device 202 scan the physical environment to capture 3D imaging data of the scanned area 204. The 3D imaging data is used to create a 3D point map 220 that includes visualizations of the physical objects in the scanned area 204. For example, the 3D point map 220 includes a visualized table 212, a visualized couch 216, a visualized entity 218 (of the dog 214), and a visualized entity 240 (of the human 238).

The handheld mobile device 202 generates a 3D baseline visualization of the scanned area 204 including the physical objects (e.g., the table 206, the couch 208) to monitor for the presence of entities (e.g., the dog 214, the human 238). For example, a user of the handheld mobile device 202 may wish to monitor their couch to ensure that their dog does not sit on the couch while the user is not home. The user can position the handheld mobile device 202 to scan the physical environment with the ToF sensor to capture 3D imaging data of the scanned area 204. The handheld mobile device 202 can generate a 3D point map based on the imaging data. The user can define a subarea that has an area coextensive with the couch 208 to define a 3D baseline visualization. The handheld mobile device 202 can operate repeat subsequent scans of the selected area and compare those scans against the 3D baseline visualization to detect the presence of an entity on the couch 208.

By using the ToF sensor to capture 3D imaging data, the handheld mobile device 202 is able to maintain privacy within the user's physical environment. For example, the ToF sensor will only capture spatial data such as shapes and depth of entities. However, the ToF sensor will not capture sensitive details such as the appearance of the entity or the clothes the entity may be wearing. For example, the sensor may detect that an entity such as a child has entered the room by capturing the child's shape, height, and depth. However, the sensor will not record the visual image of the child. Therefore, users are able to maintain privacy while monitoring private areas. For instance, the ToF sensor can be located in the user's bedroom. Although the ToF sensor can capture spatial data to monitor whether an entity is within a specifically user-selected area, the ToF sensor will not capture video content of user performing actions in their daily life. Therefore, users are able to maintain privacy despite having a ToF sensor that is constantly scanning their environment. Additionally, by not storing the video content of the user, it is not possible that a bad actor can obtain unauthorized access to such content.

In one example, a LiDAR scanner that includes the ToF sensor(s) is built into the handheld mobile device 202. The system 200 includes mapping technology that uses the LiDAR scanner to perform a method that determines ranges by targeting one or more objects or surfaces with a laser and measuring the time for the reflected light to return to the receiver of the LiDAR scanner. The LiDAR scanner uses ultraviolet, visible, or near-infrared light to image objects and make maps; therefore, the LiDAR scanner can emit a grid of dots in a form of near-infrared wavelengths and measure the amount of time it takes for the dots to travel from the handheld mobile device 202 to the physical environment. This allows the handheld mobile device 202 to accurately capture depth information about the physical environment.

The handheld mobile device 202 generates the 3D point map based on the captured imaging data of the physical environment. This initial 3D point map is set as a 3D baseline visualization. Once the 3D baseline visualization is created, the system 200 can detect the presence of an entity in an area defined by the boundary 222. The boundary 222 is a virtual perimeter that is referred to as a geofence for the scanned area 204 in the physical environment. The geofence can be dynamically generated or match a predefined set of boundaries. For example, the user can select the couch 208 as an object to geofence. The system 200 can generate a radius around the couch or alternatively the user can indicate the selected area by selecting and moving a cursor via touch inputs on a touchscreen of the handheld mobile device 202. Therefore, the boundary 222 can comprise a user-chosen size and shape within the scanned area 204. After defining the monitored area, the handheld mobile device 202 can update the 3D baseline visualization to include the boundary 222 around a monitored area.

The handheld mobile device 202 can monitor the area defined by the boundary 222 for the presence or movement of a living entity. Specifically, by subsequently scanning the physical environment with the ToF sensor(s), the handheld mobile device 202 captures spatial data of the physical environment (e.g., depth of the physical environment). The handheld mobile device 202 can extract imaging data of the physical objects (e.g., the table 206, the couch 208) from the physical environment and map the imaging data to the baseline visualized objects (e.g., the visualized table 212, the visualized couch 216). For example, after obtaining spatial information from a LIDAR scan, the handheld mobile device 202 can generate a 3D point map that is compared to a 3D baseline map before adding specific boundaries. The handheld mobile device 202 can display the 3D point map 220 to the user, who can define the boundary 222 to constrain the handheld mobile device 202 to only generate or present an alert 210 when an entity is at least partially in the monitored area defined by the boundary 222. For example, if the user has designated a specific physical object within the boundary 222 (e.g., the couch 208), the user will be alerted when an entity is located within that boundary (e.g., visualized entity 218) and not when an entity is located outside of the boundary (e.g., visualized entity 240). The alert can be further limited to indicate the presence of a type of entity or a particular entity.

In one example, the handheld mobile device 202 can detect the presence or movement of an entity in the monitored area by using a separate monitoring device 226. For example, the monitoring device 226 can continuously scan the physical environment, the scanned area 204, or only the monitored area within the boundary 222. The monitoring device 226 can include a LIDAR scanner with ToF sensors. The LiDAR scanner can continuously or periodically emit near-infrared wavelengths, therefore allowing the monitoring device 226 to detect the presence or movement of entities by determining changes between scans and compared to the 3D baseline visualization. In another implementation, the monitoring device 226 can include a camera. The type of camera can include a 360-degree camera, a dome camera, an IP camera, or any other camera suitable for monitoring the entity. The camera can also be positioned on a stationary object (e.g., a wall or the ceiling) or a moving object such as a drone.

The handheld mobile device 202 can connect to a cloud server 232. The cloud server 232 can include a machine learning engine 234 and a database 236. The database 236 can store imaging data including baseline visualizations, spatial information, and imaging data of different types of entities. For example, the database 236 can store a set of LIDAR images of different types of entities including a child, an adult human, or a pet. The set of LiDAR images can be used to recognize entities and/or to train the machine learning engine 234. The machine learning engine 234 can include a machine learning model used for image recognition. A "model," as used herein, can refer to a construct that is trained using training data to make predictions or provide probabilities for new data items, whether or not the new data items were included in the training data. For example, training data for supervised learning can include items with various parameters and an assigned classification. A new data item can have parameters that a model can use to assign a classification to the new data item. As another example, a model can be a probability distribution resulting from the analysis of training data, such as a likelihood of an n-gram occurring in a given language based on an analysis of a large corpus from that language. Examples of models include neural networks, support vector machines, decision trees, Parzen windows, Bayes, clustering, reinforcement learning, probability distributions, decision trees, decision tree forests, and others. Models can be configured for various situations, data types, sources, and output formats.

In some implementations, the machine learning engine 234 can include a neural network with multiple input nodes that receive data inputs such as LiDAR images. The input nodes can correspond to functions that receive the input and produce results. These results can be provided to one or more levels of intermediate nodes that each produce further results based on a combination of lower-level node results. A weighting factor can be applied to the output of each node before the result is passed to the next layer node. At a final layer ("the output layer"), one or more nodes can produce a value classifying the input that, once the model is trained, can be used to recognize different types of entities. In some implementations, such neural networks, known as deep neural networks, can have multiple layers of intermediate nodes with different configurations, can be a combination of models that receive different parts of the input and/or input from other parts of the deep neural network, or are convolutions—partially using output from previous iterations of applying the model as further input to produce results for the current input.

The machine learning engine 234 can be trained with supervised learning, where the training data includes spatial information of the different types of entities as input and a desired output, such as classifying and recognizing each detected entity. For example, in one implementation, the machine learning model can recognize the entity by processing data of the 3D visualization from the monitoring device 226 and comparing it to the training dataset of LiDAR images. In particular, the training dataset will include LiDAR images of human adults, human children, and types of pets as well as spatial data collected from images or scans of the physical environment. The handheld mobile device 202 can thus alert the user when a specific type of entity is detected within the selected area (e.g., boundary 222). For example, the user may only want to be alerted if their dog 214 is on the couch 208 and not elsewhere in the scanned area 204. Therefore, the handheld mobile device 202 can generate an alert when it detects the presence of the dog 214 (e.g., visualized entity 218) but not the human 238 (e.g., visualized entity 240) inside and not outside the scanned area 204 indicated in the 3D point map 220.

The handheld mobile device 202 can notify the user of the presence or movement of an entity (e.g., visualized entity 218) located within the boundary 222 via an alert. For example, the handheld mobile device 202 can generate an alert that is presented as the alert 210. The alert 210 notifies the user that the visualized entity 218 is located within the boundary 222 of the scanned area 204.

The handheld mobile device 202 can communicatively couple to a telecommunications network that administers a monitoring service. The monitoring service can enable the handheld mobile device 202 to automatically transmit the alert 210 to multiple users within the boundary 222. In one implementation, the home monitoring service can require users to create a user account for each user in a group (e.g., a household). This allows users to connect to each other easily through the home monitoring service. For example, both parents of a household may want to be notified of alerts generated by the handheld mobile device 202. That is, both parents may want to monitor that their child (e.g., the entity) does not go near the front door (e.g., a point used to create the boundary). When the handheld mobile device 202 detects that the child (e.g., the entity) is located within the boundary near the door, the handheld mobile device 202 can generate a notification that is communicated from the handheld mobile device 202 to user devices of both parents to allow either one to quickly deal with the situation.

The alert 210 can include a list of actions the user can take to deter the entity. The handheld mobile device 202 can display the list of actions to both users. For example, the list can include an option to connect to the sound device 230. This allows either parent to talk to their child via a speaker (e.g., sound device 230) to deter the child from standing in front of the front door. In another example, if the handheld mobile device 202 detects that the dog 214 is sitting on the couch 208, the handheld mobile device 202 can display an option to connect to the light device 228. This option allows the user to flash lights to deter the dog 214 from sitting on the couch 208.

In some implementations, the handheld mobile device 202 can display to the user an option for the user to set an automatic rule. The automatic rule can be triggered once the handheld mobile device 202 detects that the entity is located within the boundary 222. For example, the user can set an automatic rule to flash the lights each time the handheld mobile device 202 detects that the dog 214 is on the couch 208, therefore eliminating the need for users to constantly monitor their devices for alerts.

Figure 3:
FIG. 3 is a flowchart that illustrates a method performed by a system including a wireless handheld mobile device that is configured to detect an entity in a selected area based on a visualization of a 3D environment including the selected area.
Figure 3:
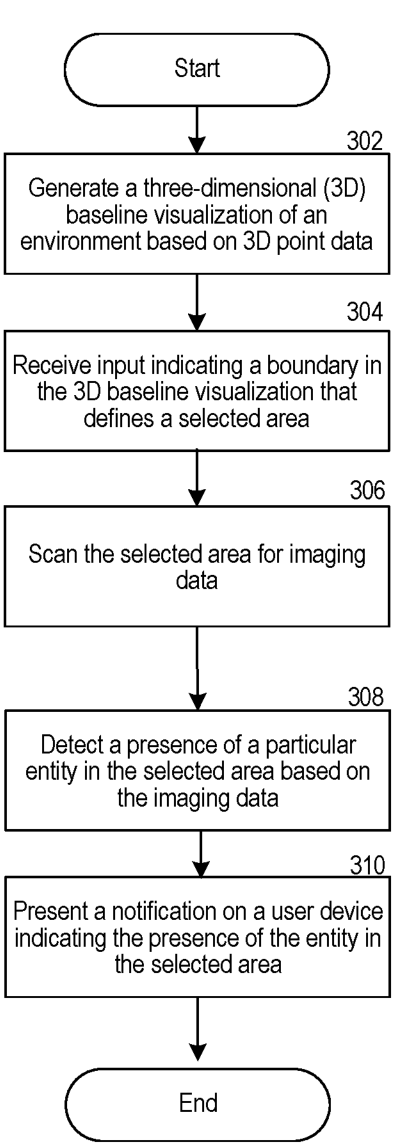

FIG. 3 is a flowchart that illustrates a method performed by a system including a wireless handheld mobile device that is configured to detect an entity in a selected area based on a visualization of a three-dimensional (3D) environment including the selected area. The method 300 can be performed by the system including, for example, a handheld mobile device (e.g., smartphone) and/or a server coupled to the handheld mobile device over a communications network (e.g., a telecommunications network). In one example, the handheld mobile device includes an imaging device and one or more time-of-flight (ToF) sensors. The handheld mobile device and/or server includes at least one hardware processor and at least one non-transitory memory storing instructions that, when executed by the at least one hardware processor, cause the system to perform the method 300.

At 302, the system causes the one or more ToF sensors to generate a 3D baseline visualization of an environment based on 3D point data. In one example, a LIDAR scanner that includes the ToF sensor(s) is built into the wireless handheld mobile device. The handheld mobile device collects 3D point data from the LiDAR scanner by targeting one or more objects or surfaces with a laser and measuring the time for the reflected light to return to the receiver of the LiDAR scanner. The LiDAR scanner uses ultraviolet, visible, or near-infrared light to image objects and generate maps. Therefore, the LiDAR scanner can emit a grid of dots in a form of near-infrared wavelengths and measure the amount of time it takes for the dots to travel from the wireless handheld mobile device to the physical environment. This allows the wireless handheld mobile device to generate the 3D baseline visualization of the environment.

At 304, the system causes the handheld mobile device to receive input indicating a boundary in the 3D baseline visualization that defines the selected area having a size and shape in the environment. The 3D baseline visualization is updated to include the boundary indicating the selected area in the environment. In one implementation, the system can receive a touch input on a touch-sensitive display screen of the wireless handheld mobile device. The touch input indicates selection of an object in the 3D baseline visualization or a user-drawn boundary having the size and shape of the selected area. For example, the user can indicate the selected area by selecting and moving a cursor via touch inputs on a touchscreen of the wireless handheld mobile device. Therefore, the boundary can comprise a user-chosen size and shape within the scanned area.

At 306, the system causes the one or more ToF sensors to scan the selected area for imaging data. The imaging data enables detection of a presence of one or more entities in the selected area while obscuring human-perceivable recognition of the one or more entities. In one implementation, the one or more ToF sensors continuously or periodically capture instances of 3D point data of the selected area. Then the handheld mobile device compares the instances of the 3D point data against the 3D baseline visualization to determine the presence of the one or more entities in the selected area. For example, the sensors can continuously or periodically emit near-infrared wavelengths, therefore allowing the handheld mobile device to detect the presence or movement of entities by determining changes between scans and compared to the 3D baseline visualization.

At 308, the system can detect a presence of a particular entity in the selected area based on the imaging data. The particular entity is of a particular type or is a specific entity designated for monitoring in the selected area. For example, the system can detect the presence of a dog within the selected area (e.g., a couch). In one implementation, the system can process the imaging data with a machine learning model that is trained based on imaging data of types of entities and non-entity objects. The imaging data of the types of entities is anonymized, in one example. The system can then generate a similarity measure indicative of a probability that the imaging data includes the particular entity. For example, a machine learning model can be trained to recognize dogs versus other entities. By doing so, the system can detect the presence of the dog on the couch by recognizing that the dog's shape has a high probability of being a dog.

At 310, the system can present a notification on a user device indicating the presence of the entity in the selected area. The notification includes an indication of the particular entity and one or more options for deterring presence of the particular entity. In one implementation, the system connects the handheld mobile device to a telecommunications network that administers a monitoring service. In one embodiment, the monitoring service stores user data. For example, one parent may add the other parent as another user who is able to monitor whether their child has entered a selected area such as the kitchen. This allows the system to transmit an alert to the plurality of user devices. Each user device within the plurality of user devices is associated with a user, such as when the user devices include two smartphones, one for each parent. In one implementation, the alert can include a list of options to deter presence of the particular entity. The options can include connecting to a visual or an audio device. For example, the parents may decide to connect to a speaker to tell their child to leave the kitchen. In another implementation, the system can receive from the user device an automatic rule. The handheld mobile device triggers the automatic rule in response to detecting the presence of the particular entity in the selected area. The automatic rule may include connecting to a visual or an audio device. For example, after detecting that a dog is near the couch, the system can automatically flash the lights in the room to deter the dog from sitting on the couch.

Computer System

Figure 4:
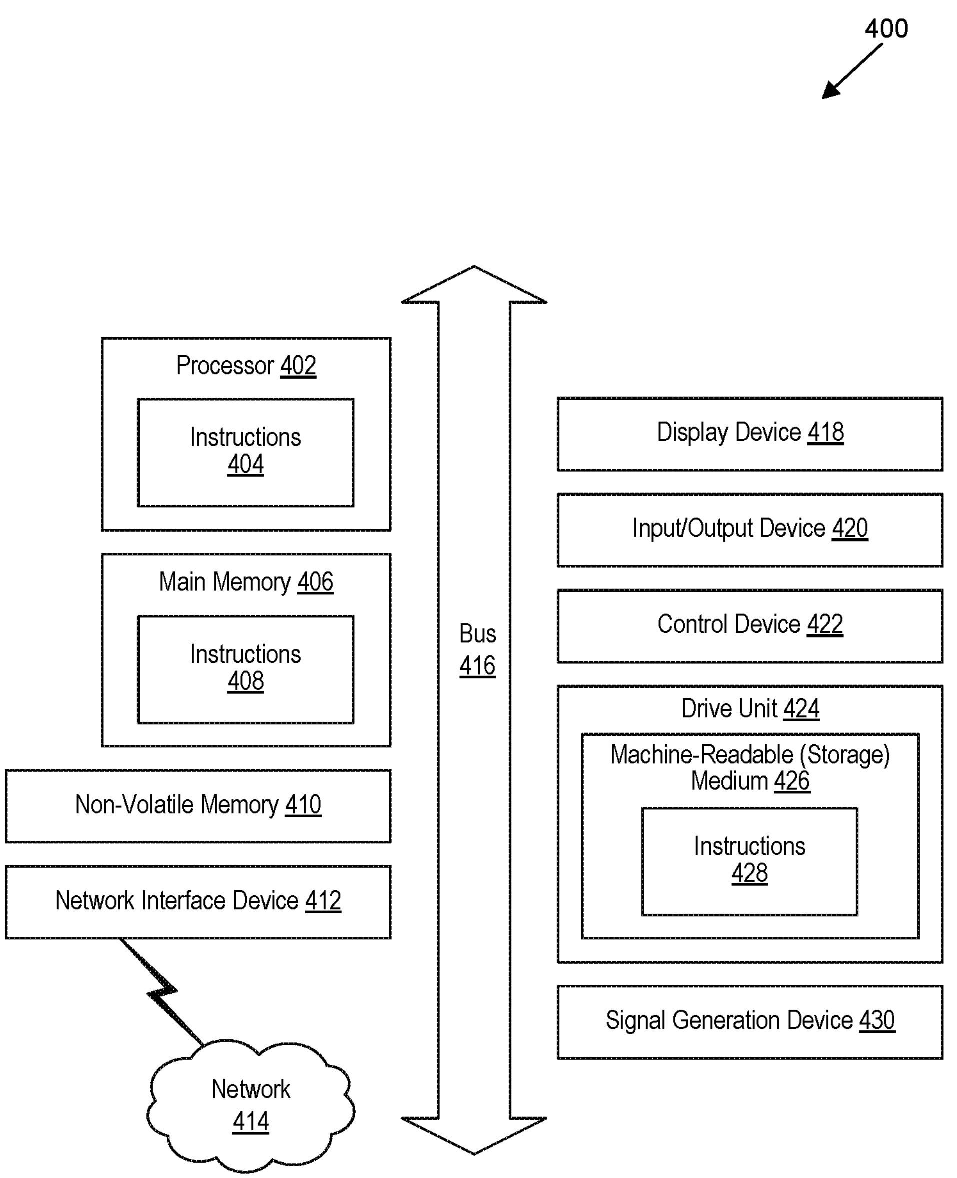
FIG. 4 is a block diagram that illustrates an example of a computer system in which at least some operations described herein can be implemented.

FIG. 4 is a block diagram that illustrates an example of a computer system 400 in which at least some operations described herein can be implemented. As shown, the computer system 400 can include: one or more processors 402, main memory 406, non-volatile memory 410, a network interface device 412, a video display device 418, an input/output device 420, a control device 422 (e.g., keyboard and pointing device), a drive unit 424 that includes a machine readable (storage) medium 426, and a signal generation device 430 that are communicatively connected to a bus 416. The bus 416 represents one or more physical buses and/or point-to-point connections that are connected by appropriate bridges, adapters, or controllers. Various common components (e.g., cache memory) are omitted from FIG. 4 for brevity. Instead, the computer system 400 is intended to illustrate a hardware device on which components illustrated or described relative to the examples of the figures and any other components described in this specification can be implemented.

The computer system 400 can take any suitable physical form. For example, the computer system 400 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computer system 400. In some implementations, the computer system 400 can be an embedded computer system, a system-on-chip (SOC), a single-board computer system (SBC), or a distributed system such as a mesh of computer systems, or it can include one or more cloud components in one or more networks. Where appropriate, one or more computer systems 400 can perform operations in real time, in near real time, or in batch mode.

The network interface device 412 enables the computer system 400 to mediate data in a network 414 with an entity that is external to the computer system 400 through any communication protocol supported by the computer system 400 and the external entity. Examples of the network interface device 412 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 406, non-volatile memory 410, machine-readable medium 426) can be local, remote, or distributed. Although shown as a single medium, the machine-readable medium 426 can include multiple media (e.g., a centralized/distributed database and/or associated caches and servers) that store one or more sets of instructions 428. The machine-readable medium 426 can include any medium that is capable of storing, encoding, or carrying a set of instructions for execution by the computer system 400. The machine-readable medium 426 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory 410, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 404, 408, 428) set at various times in various memory and storage devices in computing device(s). When read and executed by the processor 402, the instruction(s) cause the computer system 400 to perform operations to execute elements involving the various aspects of the disclosure.

Remarks

The terms "example," "embodiment," and "implementation" are used interchangeably. For example, references to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but not for other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

I claim:

1. A method performed by a system configured to detect a presence of an entity in a selected area, the method comprising:

generating a three-dimensional (3D) baseline visualization of an environment based on 3D point data captured by a first imaging device including one or more time-of-flight (ToF) sensors integrated in a wireless handheld mobile device, wherein the 3D point data indicates spatial information based on measurements of distances between the wireless handheld mobile device and one or more objects in the environment;

receiving input, from a user, indicating a boundary in the 3D baseline visualization that defines the selected area having a size and shape in the environment, wherein the 3D baseline visualization is updated to include the boundary indicating the selected area in the environment;

scanning the selected area for imaging data captured by a second imaging device including one or more ToF sensors, wherein the imaging data enables detection of a presence of one or more entities in the selected area while obscuring human-perceivable recognition of the one or more entities, and wherein human-perceivable recognition of the one or more entities is obscured by performing the scanning at a resolution that is insufficient to recognize particular features of the one or more entities;

detecting a presence of a particular entity in the selected area based on the imaging data, wherein the particular entity is of a particular type or is a specific entity designated for monitoring in the selected area; and in response to detecting the presence of the particular entity in the selected area, presenting a notification on a user device indicating the presence of the particular entity in the selected area, wherein the notification includes an indication of the particular entity and one or more options for deterring the presence of the particular entity.

2. The method of claim 1:

wherein the first imaging device is a light detection and ranging (LiDAR) device of the wireless handheld mobile device; and wherein the second imaging device is a LiDAR device that is separate and distinct form the wireless handheld mobile device.

3. The method of claim 1:

wherein the first imaging device is a LiDAR device, and wherein the second imaging device corresponds to the first monitoring device integrated in the wireless handheld mobile device.

4. The method of claim 1, wherein receiving input indicating the boundary in the 3D baseline visualization that defines a selected area comprises:

receiving a touch input on a touch-sensitive display screen of the wireless handheld mobile device, wherein the touch input indicates selection of an object in the 3D baseline visualization or a user-drawn boundary having the size and shape of the selected area.

5. The method of claim 1, wherein scanning the selected area for imaging data captured by the second imaging device comprises:

continuously or periodically capturing instances of 3D point data of the selected area; and comparing the instances of the 3D point data against the 3D baseline visualization to determine the presence of the one or more entities in the selected area.

6. The method of claim 1, wherein detecting the presence of the particular entity in the selected area based on the imaging data comprises:

processing the imaging data with a machine learning model that is trained based on imaging data of types of entities and non-entity objects, wherein the imaging data of the types of entities is anonymized; and generating a similarity measure indicative of a probability that the imaging data includes the particular entity.

7. The method of claim 1, further comprising:

communicatively coupling to a telecommunications network that administers a monitoring service, wherein the wireless handheld mobile device is subscribed to the monitoring service; and transmitting an alert to a plurality of user devices, wherein each user device within the plurality of user devices is associated with the user.

8. The method of claim 1:

wherein the one or more options for deterring the presence of the particular entity comprises connecting to a visual or an audio device.

9. The method of claim 1, further comprising:

receiving from the user device an automatic rule, wherein the wireless handheld mobile device triggers the automatic rule in response to detecting the presence of the particular entity in the selected area, and wherein the automatic rule comprises connecting to a visual or an audio device.

10. At least one non-transitory computer-readable storage medium storing instructions, which, when executed by at least one data processor of a system, cause the system to:

generate a three-dimensional (3D) baseline visualization of an environment based on 3D point data captured by an imaging device including one or more time-of-flight (ToF) sensors integrated in a wireless handheld mobile device, wherein the 3D point data indicates spatial information based on measurements of distances between the wireless handheld mobile device and one or more objects in the environment;

receive input, from a user, indicating a boundary in the 3D baseline visualization that defines a selected area having a size and shape in the environment;

scan the selected area for imaging data captured by the imaging device including the one or more ToF sensors, wherein the imaging data enables detection of a presence of one or more entities in the selected area while obscuring human-perceivable recognition of the one or more entities, and wherein human-perceivable recognition of the one or more entities is obscured by scanning the selected area at a resolution that is insufficient to recognize particular features of the one or more entities;

detect a presence of a particular entity in the selected area based on the imaging data; and present a notification on a user device indicating the presence of the particular entity in the selected area.

11. The at least one non-transitory computer-readable storage medium of claim 10, wherein to receive input indicating the boundary in the 3D baseline visualization that defines the selected area further comprises causing the system to:

receive a touch input on a touch-sensitive display screen of the wireless handheld mobile device, wherein the touch input indicates selection of an object in the 3D baseline visualization or a user-drawn boundary having the size and shape of the selected area.

12. The at least one non-transitory computer-readable storage medium of claim 10, wherein to scan the selected area for imaging data captured for the imaging data captured by the imaging device further comprises causing the system to:

continuously or periodically capture instances of 3D point data of the selected area; and compare the instances of the 3D point data against the 3D baseline visualization to determine the presence of the one or more entities in the selected area.

13. The at least one non-transitory computer-readable storage medium of claim 10, wherein to detect the presence of the particular entity in the selected area based on the imaging data further comprises causing the system to:

process the imaging data with a machine learning model that is trained based on imaging data of types of entities and non-entity objects, wherein the imaging data of the types of entities is anonymized; and generate a similarity measure indicative of a probability that the imaging data includes the particular entity.

14. The at least one non-transitory computer-readable storage medium of claim 10, wherein the system is further caused to:

communicatively couple to a telecommunications network that administers a monitoring service, wherein the wireless handheld mobile device is subscribed to the monitoring service; and transmit an alert to a plurality of user devices, wherein each user device within the plurality of user devices is associated with the user.

15. A system operable to detect a presence of an entity in a selected area, the system comprising:

a wireless handheld mobile device;

a first imaging device;

a second imaging device;

at least one hardware processor; and at least one non-transitory memory storing instructions, which, when executed by the at least one hardware processor, cause the system to:

generate a three-dimensional (3D) baseline visualization of an environment based on 3D point data captured by the first imaging device including one or more time-of-flight (ToF) sensors integrated in the wireless handheld mobile device, wherein the 3D point data indicates spatial information based on measurements of distances between the wireless handheld mobile device and one or more objects in the environment;

receive input, from a user, indicating a boundary in the 3D baseline visualization;

scan the selected area for imaging data captured by the second imaging device including one or more ToF sensors, wherein the imaging data enables detection of a presence of one or more entities in the selected area while obscuring human-perceivable recognition of the one or more entities, and wherein human-perceivable recognition of the one or more entities is obscured by scanning the selected area at a resolution that is insufficient to recognize particular features of the one or more entities;

detect the presence of a particular entity in the selected area based on the imaging data; and display a notification on a user device indicating the presence of the particular entity in the selected area.

16. The system of claim 15, further caused to:

receive from the user device an automatic rule, wherein the wireless handheld mobile device triggers the automatic rule in response to detecting the presence of the particular entity in the selected area, and wherein the automatic rule comprises connecting to a visual or an audio device.

17. The system of claim 15, further caused to:

communicatively couple to a telecommunications network that administers a monitoring service, wherein the wireless handheld mobile device is subscribed to the monitoring service; and transmit an alert to a plurality of user devices, wherein each user device within the plurality of user devices is associated with the user.

18. The system of claim 15, wherein the second imaging device is further caused to:

continuously or periodically capture instances of 3D point data of the selected area; and compare the instances of the 3D point data against the 3D baseline visualization to determine the presence of the one or more entities in the selected area.

19. The system of claim 15, wherein the wireless handheld mobile device is further caused to:

receive a touch input on a touch-sensitive display screen of the wireless handheld mobile device, wherein the touch input indicates selection of an object in the 3D baseline visualization or a user-drawn boundary having the size and shape of the selected area.

20. The system of claim 15, wherein the wireless handheld mobile device is further caused to:

process the imaging data with a machine learning model that is trained based on imaging data of types of entities and non-entity objects, wherein the imaging data of the types of entities is anonymized; and generate a similarity measure indicative of a probability that the imaging data includes the particular entity.

* * * * *